UNITED STATES PATENT OFFICE.

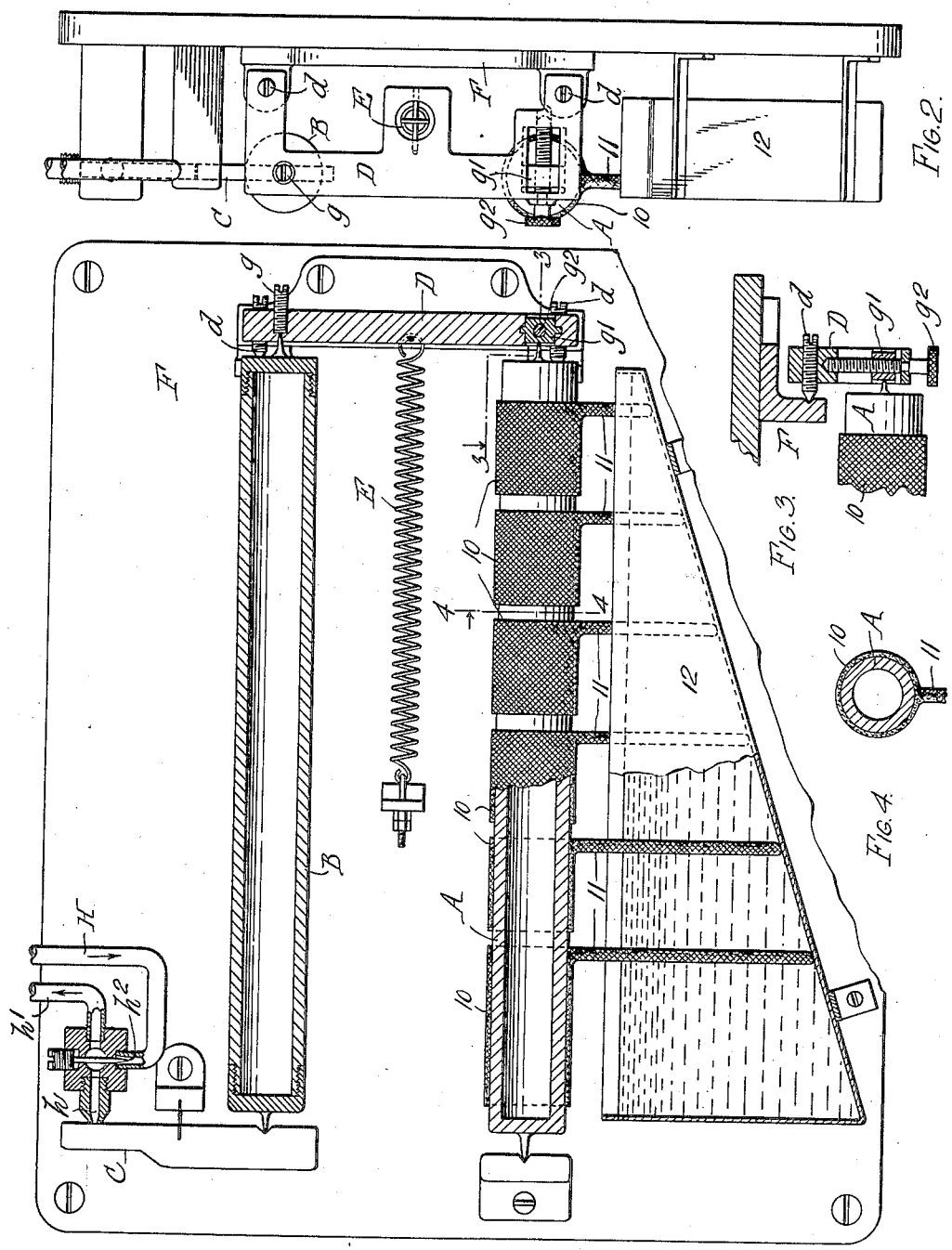

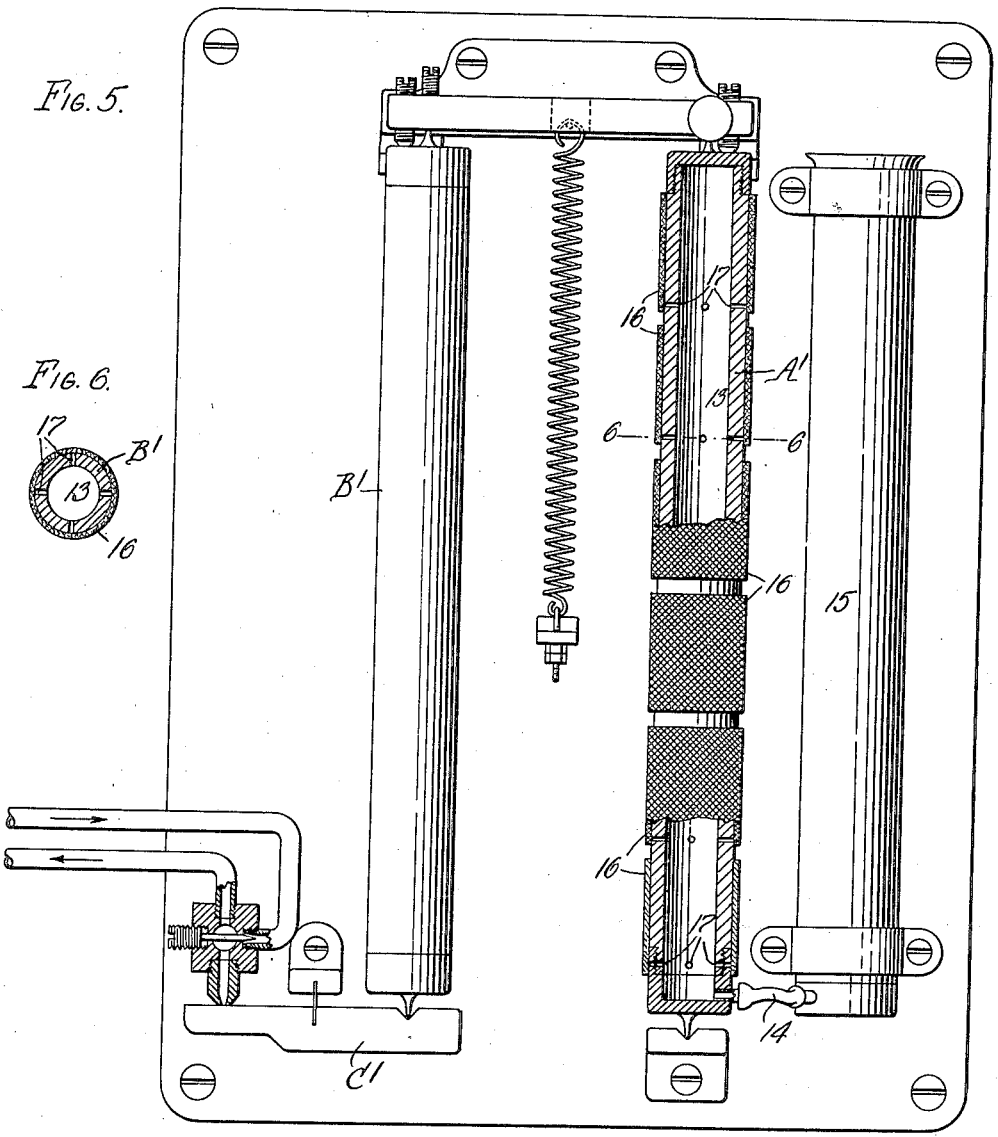

ALFRED E. STACEY, JR., OF CHICAGO, ILLINOIS, ASSIGNOR TO CARRIER ENGINEERING CORPORATION, OF NEW YORK, N. Y., A CORPORATION OF NEW YORK.

THERMORESPONSIVE INSTRUMENT.

1,377,735.          Specification of Letters Patent.     Patented May 10, 1921.

Application filed September 6, 1917. Serial No. 190,081.

*To all whom it may concern:*

Be it known that I, ALFRED E. STACEY, Jr., a citizen of the United States, residing at Chicago, in the county of Cook and State of Illinois, have invented a new and useful Improvement in Thermoresponsive Instruments, of which the following is a specification.

This invention relates to humidity regulating apparatus and more particularly to regulators and apparatus for automatically varying or altering the condition of humidity in a room or inclosure in a definite manner, or according to a predetermined scale of change.

The apparatus is useful, for instance, for controlling the humidity of the air used for drying various materials where it is desired to graduate the drying action, using at the start an atmosphere having a relatively high humidity to prevent a too rapid drying of the material and gradually, or by stages, reducing the humidity of the atmosphere to increase its drying effect as the operation continues.

The humidity is regulated or altered under the control of a regulator which comprises coöperating dry and wet bulb thermoresponsive elements, respectively responsive to changes in the dry and wet bulb temperatures of the surrounding air, and means for varying the effect of the wet bulb temperature on the wet bulb element, or causing the wet bulb temperature to affect in succession differing areas of the wet bulb element. Preferably the wet bulb element is surrounded by pieces of wicking or absorbent material and a reservoir containing water is provided for independently wetting the wicks in such a way that as the water gradually evaporates from the reservoir, one piece of wicking after another becomes dry, and a gradually decreasing length of the wet bulb element is kept wet or in condition to respond to changes in the wet bulb temperature. In this way there is a gradual increase in depression between the wet and dry bulb elements causing a gradual change in their relative or differential action, and consequently a gradual change in the humidity controlled by the regulator. Since the time required for evaporating the water depends upon conditions such as the volume of water used and the surface area of the water, the time of variation from one humidity to another can be regulated as desired by using water reservoirs of different capacities and forms or changing the capacity of the reservoir.

In the accompanying drawings:

Figure 1 is a front elevation, partly in section, of a humidity regulator embodying the invention.

Fig. 2 is an end elevation thereof.

Fig. 3 is a sectional plan view thereof on line 3—3, Fig. 1.

Fig. 4 is a section thereof on line 4—4, Fig. 1.

Fig. 5 is a front elevation of a regulator of modified construction.

Fig. 6 is a section thereof on line 6—6, Fig. 5.

Fig. 7 is a plan view thereof.

Referring first to the construction shown in Figs. 1 to 4, A and B represent respectively wet and dry bulb thermoresponsive elements which may be of any suitable form and material and may be operatively associated or connected with a regulating device C in such a way that the position of the device C and consequently its regulating action is dependent upon the relative or differential expansion and contraction of the two elements A and B. With the exception of the means, hereinafter described, for varying the effect of the wet bulb temperature on the wet bulb element A, the regulator may be a wet and dry bulb hygrostat or instrument of any suitable construction. As shown, it is constructed substantially like the regulator disclosed in Patent No. 1,138,082, granted May 4, 1915, to Willis H. Carrier, assignor; that is, the two elements A and B are parallel and one end of the dry bulb element B bears against the regulating lever or device C, while the opposite end of this element and the free end of the wet bulb element A bear against a pivoted lever or frame D, which is held against the ends of the two elements by a suitable spring E. The frame D is suitably fulcrumed, as by screws $d$, on a suitable support F and has an adjustable bearing screw $g$ and an adjustable bearing block $g'$ for the dry bulb and wet bulb elements A and B respectively. The spring E, which is attached at opposite ends to the frame D and to the support F, draws the frame D toward and holds it in engagement with the expansible elements A and B but permits the frame to be moved in the opposite direction by the expansion of the elements.

The fulcrum block $g'$ is adapted to be adjusted by a screw $g^2$ toward and from the fulcrum line of the frame D for regulating the motion of the frame D by the wet bulb element. The regulating lever or device C will remain stationary or will be moved in one direction or the other, depending upon the relative changes in length of the two elements A and B caused by changes in wet and dry bulb temperatures affecting them. One end of the lever or device C shown acts as a valve to control a bleeder port $h$ in a branch $h'$ of a pipe H which supplies compressed air to the actuating diaphragm or motor of the apparatus for changing the humidity of the atmosphere in the room in which the regulator is located. The compressed air supply pipe has a restriction $h^2$ which permits only a restricted flow to the motor. When the bleeder port is closed by the regulating device C, the air will pass to the motor and operate it to move the part actuated thereby in one direction, whereas, when the regulating device C is moved to open the bleeder port, the air will escape from the motor through this port faster than it can pass the restriction to the motor, thus permitting an opposite movement of the part actuated by the motor. Any other instrumentalities governed by the movement of the lever C, or other device actuated by the differential action of the thermoresponsive elements A and B, can be employed in place of those described for effecting the regulated variation of the humidity.

The means employed for changing the effect of the wet bulb temperature on the wet bulb element, consists, in the regulator shown in Figs. 1 to 4, of a plurality of pieces of wicking or absorbent material 10 surrounding the wet bulb element A, and having extensions or portions 11 which dip into water in a trough or reservoir 12 disposed lengthwise beneath the element A, which is horizontal. The several wicks are spaced apart on the element A, or other suitable provision is made to prevent the water from communicating from one wick to the next so that each wick must receive its water independently from the reservoir. The wicks dip into the water to different depths so that as the water evaporates from the reservoir its surface drops below the depending portions of one wick after another, permitting one after another of the wicks to become dry. In this way a gradually decreasing portion or area of the element A is kept wet so as to be responsive to the wet bulb temperature of the air, and the amount of expansion or contraction of the element in response to changes in the wet bulb temperature of the air gradually alters, causing a gradual change in the differential action of the two elements A and B on the regulating device. The reservoir 12 shown increases in depth lengthwise. Therefore, the water has the greatest surface area and the rate of evaporation is greatest when the reservoir is full, and the surface area and rate of evaporation decreases as the level of the water lowers. By using a reservoir of equal depth throughout, the rate of evaporation would be more nearly uniform, and by using reservoirs of different volumes or by other appropriate changes in the proportion or relation of the parts it is possible to alter the rate of evaporation or graduated action of the regulator more or less as may be necessary to secure different desired results.

In the construction shown in Figs. 5 to 7, the wet and dry bulb elements A' and B' are arranged vertically instead of horizontally but they are operatively connected with the regulating device C' and operate the same substantially in the way before described. In this construction the wet bulb element A' is hollow, forming a water chamber 13 therein, which is connected at its lower end, by a suitable tube or passage 14 with an upright water reservoir 15. The wet bulb element is surrounded by a plurality of pieces of wicking or the like 16 and one or more holes 17 are provided in the walls of the element A' at different elevations through which the water escapes from the chamber 13 to wet each of the wicks. The water level will lower in the reservoir and in the hollow element A' as the water evaporates so that one wick after another will be left above the level of the water and will become dry, thereby gradually decreasing the portion of the element which is kept wet and responsive to the wet bulb temperature of the air, and graduating the action of the instrument in a manner similar to that before described. In this arrangement also a variation in the volume or form of the reservoir 15 or of the hollow element would give different results.

In either of the constructions described the number of the wicks and the extent of the wet bulb element which are wetted at first depends upon the height to which the reservoir is filled. A desired initial wet bulb depression can be secured by filling the reservoir to the appropriate level.

While in both of the constructions described the gradual reduction of the wetted surface of the wet bulb element is produced by the evaporation of the water, the invention is not necessarily restricted to this way of accomplishing the reduction, since a similar result could be effected in other ways.

The regulator can be utilized in different ways in drying processes for graduating the drying action as desired, as for example by using air having a constant dew point and controlling the temperature in the drying chamber by means of the regulator so as to give a gradually decreasing relative humidity. Another method is to vary the relative humidity by maintaining a constant temperature and gradually varying the dew point of the air used.

The regulator herein claimed can be used in connection with apparatus such as disclosed in Letters Patent No. 1,312,759, dated August 12th, 1919, granted to me.

I claim as my invention:

1. A thermoresponsive instrument including an element which is affected by changes in temperature, means for causing a portion of said element to be subjected to the wet bulb temperature of the surrounding air so as to respond to changes in said wet bulb temperature, and means for changing the extent of the portion of the element which is subjected to the wet bulb temperature, whereby the thermoresponsive action of the element changes in accordance with the changes in extent of the portion of the element subject to the wet bulb temperature.

2. A thermoresponsive instrument including an element which is affected by changes in temperature, means for enveloping a portion of said element with moisture whereby the evaporation of said moisture causes the enveloped portion of the element to respond to changes in the wet bulb temperature of the surrounding air, and means for changing the extent of the portion of the element which is enveloped by the moisture, whereby the thermoresponsive action of the element changes in accordance with the changes in extent of the portion of the element enveloped by the moisture.

3. A thermoresponsive instrument including an element which is affected by changes in temperature, means for enveloping a portion of said element with moisture whereby the evaporation of said moisture causes the enveloped portion of the element to respond to changes in the wet bulb temperature of the surrounding air, and means for reducing by predetermined amounts the extent of the portion of the element which is enveloped by the moisture, whereby the thermoresponsive action of the element changes in accordance with the reductions in the portion of the element enveloped by the moisture.

4. A thermoresponsive instrument comprising a thermoresponsive element, a plurality of wicks for evaporating moisture adjacent to different portions of said element, and means for moistening said wicks and causing one wick after another to become dry.

5. A thermoresponsive instrument comprising a thermoresponsive element, a plurality of wicks for evaporating moisture adjacent to different portions of said element, and a reservoir containing a liquid for moistening said wicks, said reservoir and wicks being arranged to cause one wick after another to become dry as the liquid evaporates.

6. A thermoresponsive instrument comprising a thermoresponsive element, a plurality of wicks for evaporating moisture adjacent to different portions of said element, and a reservoir containing a liquid for moistening said wicks, said reservoir being arranged so that the liquid lowers out of contact with one wick after another as the liquid evaporates and its level lowers in the reservoir.

7. A thermoresponsive instrument comprising wet and dry bulb elements which are respectively responsive to changes in the wet and dry bulb temperatures of the surrounding air, a device which is actuated by the differential action of said wet and dry bulb elements, means for causing the evaporation of moisture in the vicinity of said wet bulb element, and means for automatically varying the extent of the portion of said wet bulb element which responds to changes in the wet bulb temperature.

8. A thermoresponsive instrument comprising wet and dry bulb elements which are respectively responsive to changes in the wet and dry bulb temperatures of the surrounding air, a device which is actuated by the differential action of said wet and dry bulb elements, means for causing the evaporation of moisture in the vicinity of said wet bulb element, and means for automatically reducing gradually the portion of said element which responds to changes in the wet bulb temperature.

9. A thermoresponsive instrument comprising wet and dry bulb elements which are respectively responsive to changes in the wet and dry bulb temperatures of the surrounding air, a device which is actuated by the differential action of said wet and dry bulb elements, a plurality of wicks for evaporating moisture adjacent to different portions of said wet bulb element, and means for moistening said wicks and causing one wick after another to become dry.

10. A thermoresponsive instrument comprising wet and dry bulb elements which are respectively responsive to changes in the wet and dry bulb temperatures of the surrounding air, a device which is actuated by the differential action of said wet and dry bulb elements, a plurality of wicks for evaporating moisture adjacent to different portions of said wet bulb element, and a reservoir containing a liquid for moistening said wicks, said reservoir being arranged so that the liquid lowers out of contact with one wick after another as the liquid evaporates and its level lowers in the reservoir.

Witness my hand this 27th day of August, 1917.

ALFRED E. STACEY, Jr.

Witnesses:
C. WEBSTER ANDREWS,
C. A. BRADY.